US006653429B1

United States Patent
Nakagawa et al.

(10) Patent No.: US 6,653,429 B1
(45) Date of Patent: Nov. 25, 2003

(54) PROCESS FOR PRODUCING POLYMER, THE POLYMER, AND CURABLE COMPOSITION COMPRISING THE POLYMER

(75) Inventors: Yoshiki Nakagawa, Kobe (JP); Kenichi Kitano, Kobe (JP); Masayuki Fujita, Kobe (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/701,696

(22) PCT Filed: Jun. 1, 1999

(86) PCT No.: PCT/JP99/02927

§ 371 (c)(1),
(2), (4) Date: Feb. 9, 2001

(87) PCT Pub. No.: WO99/62965

PCT Pub. Date: Dec. 9, 1999

(30) Foreign Application Priority Data

| Jan. 6, 1998 | (JP) | 10-151574 |
| Jul. 23, 1998 | (JP) | 10-207323 |
| Jul. 23, 1998 | (JP) | 10-207325 |
| Jul. 23, 1998 | (JP) | 10-207326 |
| Oct. 19, 1998 | (JP) | 10-296619 |

(51) Int. Cl.$^7$ ............................................. C08J 120/16
(52) U.S. Cl. ........................ 526/329.7; 526/90; 526/328; 526/346; 526/307.1; 526/319; 525/330.3; 525/153; 525/154; 525/190; 525/326.1; 525/329.7
(58) Field of Search .................. 526/329.7, 328, 526/346, 307.1, 319, 90; 525/330.3, 55, 153, 154, 190, 326.1, 329.7, 330.2, 339, 451

(56) References Cited

U.S. PATENT DOCUMENTS

| 5,763,548 A | 6/1998 | Matyjaszewski et al. |
| 5,789,487 A | 8/1998 | Matyjaszewski et al. |
| 5,807,937 A | 9/1998 | Matyjaszewski et al. |
| 6,274,688 B1 * | 8/2001 | Nakagawa et al. ...... 526/329.7 |

FOREIGN PATENT DOCUMENTS

| EP | 0 789 036 A2 | 8/1997 |
| EP | 0 816 385 A1 | 7/1998 |
| WO | WO 96/30421 | 10/1996 |
| WO | WO 97/18247 | 5/1997 |
| WO | WO 98/01480 | 1/1998 |
| WO | WO 98/40415 | 9/1998 |

* cited by examiner

*Primary Examiner*—Tatyana Zalukaeva
(74) *Attorney, Agent, or Firm*—Connolly, Bove, Lodge & Hutz

(57) ABSTRACT

This invention provides method of producing a polymer which comprises substitution of carboxylic acid group for a terminal halogen group of a polymer obtainable by atom transfer radical polymerization. The carboxylic acid group may be a carboxylic acid salt group, more preferably a carboxylic acid potassium salt group. In carrying out the atom transfer radical polymerization in the practice of the invention, a transition metal complex can be used as a polymerization catalyst. The transition metal complex may be a transition metal complex with an element of the group 7, 8, 9, 10 or 11 of the periodic table as the central atom, more preferably a copper, nickel, ruthenium or iron complex and, in particular, a copper complex is used. The polymer obtainable by atom transfer radical polymerization is obtained by polymerization of a (meth)acrylic monomer, particularly the polymer obtained by polymerization of an acrylic acid ester monomer.

47 Claims, No Drawings

PROCESS FOR PRODUCING POLYMER, THE POLYMER, AND CURABLE COMPOSITION COMPRISING THE POLYMER

TECHNICAL FIELD

The present invention relates to the reaction of the terminal halogen atom of a vinyl polymer having a specific structure with a carboxylic acid group.

BACKGROUND ART

To produce long-chain polymers by coupling growing terminals of polymers to each other is known in the art. In the case of anion polymerization, such coupling can be effected by adding a compound having two electrophilic functional groups. In the case of cation polymerization, the coupling can be effected in the same manner by adding a compound having two nucleophilic functional groups.

On the other hand, it is known that polymers having a terminal functional group, either alone or in combination with an appropriate curing agent, can be crosslinked to give cured products excellent in heat resistance and durability. Among others, hydroxy- or crosslinkable silyl-terminated polymers are typical examples. Hydroxy-terminated polymers can be crosslinked and cured by using a polyfunctional isocyanate compound as a curing agent. Crosslinkable silyl-terminated polymers absorb moisture in the presence of an appropriate condensation catalyst, to give cured products.

As the main chain skeleton of such hydroxy- or crosslinkable silyl-terminated polymers, there may be mentioned polyether polymers such as polyethylene oxide, polypropylene oxide and polytetramethylene oxide, hydrocarbon polymers such as polybutadiene, polyisoprene, polychloroprene and polyisobutylene, and hydrogenation products derived therefrom, and polyester polymers such as polyethylene terephthalate, polybutylene terephthalate and polycaprolactone, among others. These polymers are used for various purposes according to the main chain skeleton and the mode of crosslinking.

In contrast to the coupling reaction relevant to those polymers obtainable by ionic polymerization or polycondensation, the art of coupling together the termini of vinyl polymers obtainable by radical polymerization has scarcely been put to practical use. In the case of radical polymerization as contrasted to ionic polymerization, although it is possible theoretically to directly couple together radicals which are growing termini, because the radical polymerization reaction itself cannot be easily controlled and, hence, the coupling reaction is hardly controllable.

Among vinyl polymers, (meth)acrylic polymers have high weathering resistance, transparency and other characteristics, which cannot be expected of the above-mentioned polyether polymers, hydrocarbon polymers or polyester polymers. Among others, (meth)acrylic polymers having alkenyl or crosslinking silyl groups on side chains are used in high weathering resistance coatings and the like. On the other hand, it is not easy to control the polymerization of acrylic polymers due to side reactions and it is very difficult to couple growing termini thereof.

As the advantages of such a crosslinking reaction, there may be mentioned the increase in molecular weight as resulting from chain extension and the possibility of synthesizing block copolymers and of synthesizing functional group-terminated polymers, among others. Upon coupling, the molecular weight of a polymer having one growing terminus is doubled and, theoretically, that of a polymer having two growing termini is indefinitely increased. Upon coupling of a diblock copolymer synthesized by sequential addition of monomers, a triblock copolymer of type ABA is synthesized. In the case of a polymer as polymerized using a functional group-containing initiator, coupling of growing termini gives a polymer having the functional groups at both termini.

Vinyl polymers having crosslinking functional groups at both termini give cured products having superior physical characteristics as compared with those having crosslinking functional groups in side chains. Therefore, a number of workers have so far made investigations to find out a simple and easy method of producing the same. However, it is still not easy to produce them on an industrial scale. In Japanese Kokai Publication Hei-05-255415, there is disclosed a method of synthesizing (meth)acrylic polymers having alkenyl groups at both termini which comprise using an alkenyl-containing disulfide as a chain transfer agent. Japanese Kokai Publication Hei-5-262808 discloses a process for synthesizing a (meth)acrylic polymer having alkenyl groups at both termini which comprises synthesizing a (meth)acrylic polymer having hydroxyl groups at both termini using a hydroxy-containing disulfide and, taking advantage of the reactivity of said hydroxyl group, introducing alkenyl groups at both termini. However, it is not easy to control the molecular weight of the polymer in these methods. Further, for terminally introducing an alkenyl group with certainty, the use of a chain transfer agent in a substantial amount is essential, which raises a problem from production process points of view, however.

Furthermore, since these methods use ordinary radical polymerization techniques, it is not easy to control the molecular weight and molecular weight distribution (ratio of number average molecular weight to weight average molecular weight) of the polymer to be obtained.

Among functional groups, the carboxyl group can react with various reactive groups such as hydroxy, amino and epoxide, hence is a functional group effective as a crosslinking group. The use of a functional group-containing chain transfer agent as a means for introducing a carboxyl group into a polymer terminus is known in the art. Japanese Kokai Publication Hei-08-208759 and JP 1603919, for instance, disclose a technology for synthesizing carboxyl-terminated (meth)acrylic polymers using a mercaptocarboxylic acid as the chain transfer agent.

Meanwhile, graft copolymers are used as functional materials in various fields. For synthesizing graft copolymers with vinyl polymers as branching polymers, some methods are known. Thus, for example, a method of polymerization is known which comprises causing polymer branches to grow by polymerizing a monomer from polymerization initiation sites on a stem polymer (synthetic method 1). Another comprises using a polymer (macromonomer) having a terminal polymerizable double bond as a branch polymer and synthesizing a stem polymer later by homopolymerizing the macromonomer or copolymerizing the same with another vinyl monomer (synthetic method 2). According to synthetic method 1, radicals are formed on a stem polymer by utilizing a radical generator such as benzoyl peroxide or by irradiation of radiation and causing the polymerization of a branch polymer-constituting vinyl monomer to initiate from those radicals. Though it is simple and easy, synthetic method 1 cannot be free from side reactions, such as formation of homopolymers of the vinyl monomer used and/or decomposition of the stem polymer. As for synthetic method 2, it has the advantage that a graft copolymer having a definite structure can be obtained since the branch polymer is synthesized in advance. However, it is not easy to synthesize macromonomers, and only limited macromonomer species can be used.

On the other hand, a coupling method which comprises synthesizing a functional group-terminated branch polymer beforehand and coupling the branch polymer to a stem polymer utilizing the reactivity of the functional group (synthetic method 3) is also known. As the functional group-terminated branch polymer, there may be mentioned, for example, the polymer comprising the main chain skeleton as follows: thus, polyether polymers such as polyethylene oxide, polypropylene oxide and polytetramethylene oxide, hydrocarbon polymers such as polybutadiene, polyisoprene, polychloroprene, polyisobutylene and hydrogenation products derived from these, and polyester polymers such as polyethylene terephthalate, polybutylene terephthalate and polycaprolactone.

It is an object of the present invention to provide a method of coupling vinyl polymers, a method of terminal functional group introduction, a method of producing graft polymers, an improved method for carrying out such a reaction, and polymers produced by these methods.

DISCLOSURE OF THE INVENTION

The present invention provides a method of producing a polymer which comprises substitution of carboxylic acid group for the terminal halogen atom of a polymer obtainable by atom transfer radical polymerization.

The carboxylic acid group is preferably a carboxylic acid salt group, more preferably a carboxylic acid potassium salt group.

In carrying out the atom transfer radical polymerization in the practice of the invention, a transition metal complex can be used as a polymerization catalyst. The transition metal complex is preferably a transition metal complex with an element of the group 7, 8, 9, 10 or 11 of the periodic table as the central atom, more preferably a copper, nickel, ruthenium or iron complex and, in particular, a copper complex is preferred.

The polymer obtainable by atom transfer radical polymerization is preferably the polymer obtained by polymerization of a (meth)acrylic monomer, particularly the polymer obtained by polymerization of an acrylic acid ester monomer.

The terminal halogen atom of the polymer obtained by atom transfer radical polymerization is preferably a secondary halogen atom.

The reaction involved in the production method of the invention can be accelerated by carrying out it in the presence of a nitrogen atom-containing compound. The nitrogen atom-containing compound is preferably one selected from the group consisting of aliphatic amines, alicyclic amines, aromatic amines and heterocyclic nitrogen bases. Further, when an amine compound or pyridine compound is used as the ligand of a polymerization catalyst in atom transfer radical polymerization, it is also effective to use that ligand as the nitrogen atom-containing compound or, when an amine compound or pyridine compound is used as the ligand of a polymerization catalyst in atom transfer radical polymerization, it is also effective, in carrying out the reaction for substituting a carboxylic acid group for the terminal halogen atom, to add the carboxyl-containing compound directly to the vinyl monomer polymerization system.

The carboxylic acid group-containing compound to be used may be a polymer, or a polymer having carboxylic acid groups on side chains, or a compound having two or more carboxylic acid groups, for instance.

As the polymer obtainable by the reaction according to the invention, there may be mentioned graft polymers, gels, coupled polymers, terminally functional polymers, in particular carboxylic acid group-terminated polymers, and so forth.

Also applicable as the carboxylic acid group-containing compound are compounds obtained by reacting a cyclic acid anhydride with a functional group-containing alcohol and, as the functional group, there may be mentioned one selected from the group consisting of alkenyl, hydroxy, amino and epoxy groups. As the cyclic acid anhydride, there may be mentioned one selected from the group consisting of succinic anhydride, phthalic anhydride and glutaric anhydride.

The present invention is also directed to the polymer produced by the above-mentioned production method of the invention.

The vinyl polymer having a carboxyl group at a main chain terminus as obtainable by the production method of the present invention can be used in curable compositions which contain said polymer as a constituent, together with another component such as an epoxy-containing compound, a hydroxy-containing compound, an amino-containing compound, an isocyanato-containing compound, etc.

BEST MODES FOR CARRYING OUT THE INVENTION

In the following, the halogen-terminated polymer obtainable by atom transfer radical polymerization (hereinafter referred to as "polymer A") and the compound having a carboxylic acid group substituting for the terminal halogen atom (hereinafter referred to as "compound B") are described.

<Description of Polymer A>

In the following, the halogen-terminated polymer A obtainable by atom transfer radical polymerization is described.

Outline of Atom Transfer Radical Polymerization

The "living radical polymerization" proceeds at a high polymerization rate and hardly undergoes a termination reaction and gives a polymer with a narrow molecular weight distribution (an Mw/Mn value of about 1.1 to 1.5) in spite of its being a mode of radical polymerization which is generally considered to be difficult to control because of the tendency toward occurrence of a termination reaction such as radical-to-radical coupling. It is also possible, in living radical polymerization, to liberally control the molecular weight by adjusting the monomer/initiator charge ratio.

The "living radical polymerization" method thus can give a low viscosity polymer with a narrow molecular weight distribution and, in addition, makes it possible to introduce a specific functional group-containing monomer into the polymer mostly at the desired sites and, therefore, is preferred as the method of producing the above specific functional group-containing vinyl polymer.

While the term "living polymerization", in its narrower sense, means polymerization in which molecular chains grow while the termini thereof always retain their activity, said term generally includes, within the meaning thereof, quasi-living polymerization in which molecular chains grow while terminally inactivated molecules and terminally active molecules are present in a state of equilibrium. The latter definition applies to the living polymerization to be employed in the practice of the present invention.

The "living radical polymerization" has recently been studied by various groups of researchers with great enthusiasm. As examples, there may be mentioned, among others, the use of a cobalt-porphyrin complex as described in J. Am. Chem. Soc., 1994, vol. 116, pages 7943 ff, the use of a radical capping agent such as a nitroxide compound as described in Macromolecules, 1994, vol. 27, pages 7228 ff., and the technique of "atom transfer radical polymerization (ATRP)" which uses an organic halide or the like as the initiator and a transition metal complex as the catalyst.

Among various "living radical polymerization" techniques, the above "atom transfer radical polymerization" technique, which uses an organic halide, a halogenated sulfonyl compound or the like as the initiator and a transition metal complex as the catalyst for polymerizing vinyl monomers, has, in addition to the above-mentioned advantages of "living radical polymerization", the advantage that it gives a polymer having a halogen or the like, which is relatively advantageous for functional group conversion, at main chain termini and that the degree of freedom in initiator and catalyst designing is large and, therefore, is more preferred as the method for producing vinyl polymers having a specific functional groups. This atom transfer radical polymerization is described, for example, by Matyjaszewski et al. in J. Am. Chem. Soc., 1995, vol. 117, pages 5614 ff.; Macromolecules, 1995, vol.28, pages 7901 ff.; Science, 1996, vol. 272, pages 866 ff.; WO 96/30421, WO 97/18247, WO 98/01480 and WO98/40415, and by Sawamoto et al. in Macromolecules, 1995, vol. 28, pages 1721 ff; Japanese Kokai Publication Hei-09-208616 and Japanese Kokai Publication Hei-08-41117, among others.

The atom transfer radical polymerization includes, within the meaning thereof, not only the above-mentioned ordinary atom transfer radical polymerization in which an organic halide or halogenated sulfonyl compound is used as the initiator but also the "reverse atom transfer radical polymerization" in which a standard free radical polymerization initiator, such as a peroxide, is used in combination with a higher-oxidized-state complex of an ordinary atom transfer radical polymerization catalyst, such as a copper (II) complex.

Monomer

The vinyl monomer to be used in the practice of the invention is not particularly restricted but includes various species. As examples, there may be mentioned (meth)acrylic acid, methyl(meth)acrylate, ethyl(meth)acrylate, n-propyl (meth)acrylate, isopropyl(meth)acrylate, n-butyl(meth) acrylate, isobutyl(meth)acrylate, tert-butyl(meth)acrylate, n-pentyl(meth)acrylate, n-hexyl(meth)acrylate, cyclohexyl (meth)acrylate, n-heptyl(meth)acrylate, n-octyl(meth) acrylate, 2-ethylhexyl(meth)acrylate, nonyl(meth)acrylate, decyl(meth)acrylate, dodecyl(meth)acrylate, phenyl(meth) acrylate, toluyl(meth)acrylate, benzyl(meth)acrylate, 2-methoxyethyl(meth)acrylate, 3-methoxybutyl(meth) acrylate, 2-hydroxyethyl(meth)acrylate, 2-hydroxypropyl (meth)acrylate, stearyl(meth)acrylate, glycidyl(meth) acrylate, 2-aminoethyl(meth)acrylate, γ-(methacryloyloxypropyl)trimethoxysilane, (meth)acrylic acid-ethylene oxide adducts, trifluoromethylmethyl(meth) acrylate, 2-trifluoromethylethyl(meth)acrylate, 2-perfluoroethylethyl(meth)acrylate, 2-perfluoroethyl-2-perfluorobutylethyl(meth)acrylate, 2-perfluoroethyl(meth) acrylate, perfluoromethyl(meth)acrylate, diperfluoromethylmethyl(meth)acrylate, 2-perfluoromethyl-2-perfluoroethylmethyl(meth)acrylate, 2-perfluorohexylethyl(meth)acrylate, 2-perfluorodecylethyl (meth)acrylate, 2-perfluorohexadecylethyl(meth)acrylate and like (meth)acrylic monomers; styrene, vinyltoluene, α-methylstyrene, chlorostyrene, styrenesulfonic acid and salts thereof, and like styrenic monomers; perfluoroethylene, perfluoropropylene, vinylidene fluoride and like fluorine-containing vinyl monomers; vinyltrimethoxysilane, vinyltriethoxysilane and like silicon-containing vinyl monomers; maleic anhydride, maleic acid, maleic acid monoalkyl esters and dialkyl esters; fumaric acid, fumaric acid monoalkyl esters and dialkyl esters; maleimide, methylmaleimide, ethylmaleimide, propylmaleimide, butylmaleimide, hexylmaleimide, octylmaleimide, dodecylmaleimide, stearylmaleimide, phenylmaleimide, cyclohexylmaleimide and like maleimide monomers; acrylonitrile, methacrylonitrile and like nitrile group-containing vinyl monomers; acrylamide, methacrylamide and like amide group-containing vinyl monomers; vinyl acetate, vinyl propionate, vinyl pivalate, vinyl benzoate, vinyl cinnamate and like vinyl esters; ethylene, propylene and like alkenes; butadiene, isoprene and like conjugated dienes; vinyl chloride, vinylidene chloride, allyl chloride and allyl alcohol, among others. These may be used singly or a plurality of such monomers may be copolymerized. Among them, styrenic monomers and (meth)acrylic monomers are preferred from the viewpoint of physical properties of products, among others. Acrylic ester monomers and methacrylic ester monomers are more preferred and butyl acrylate is still more preferred. In the practice of the invention, these preferred monomers may be copolymerized with some other monomer and, in that case, the proportion of the preferred monomers is preferably not less than 40% by weight.

Initiator

In the atom transfer radical polymerization, an organic halide (e.g. an ester compound having a halogen atom at the α position or a compound having a halogen atom at the benzyl position) or a halogenated sulfonyl compound is generally used as the initiator. A substituent capable of serving as a substitute for a halogen atom may also be used. Specific examples are, among others:

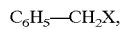

$C_6H_5-CH_2X$,

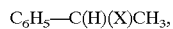

$C_6H_5-C(H)(X)CH_3$,

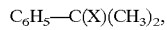

$C_6H_5-C(X)(CH_3)_2$, (in the above chemical formulas, $C_6H_5$ is a phenyl group and X is chlorine, bromine or iodine);

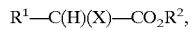

$R^1-C(H)(X)-CO_2R^2$,

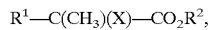

$R^1-C(CH_3)(X)-CO_2R^2$,

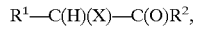

$R^1-C(H)(X)-C(O)R^2$,

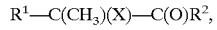

$R^1-C(CH_3)(X)-C(O)R^2$, (in which $R^1$ and $R^2$ are the same or different and each is a hydrogen atom or an alkyl group containing 1 to 20 carbon atoms, an aryl group containing 6 to 20 carbon atoms or an aralkyl group containing 7 to 20 carbon atoms and X is chlorine, bromine or iodine); and

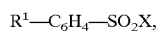

$R^1-C_6H_4-SO_2X$, (in which $R^1$, $R^2$ and X are as defined above).

It is also possible to use, as the initiator in living radical polymerization an organic halide or halogenated sulfonyl compound having a functional group other than the functional group for initiating the polymerization. In such a case, vinyl polymers having the functional group at one main chain terminus and the halogen atom at the other main chain terminus are produced. As such functional group, there may be mentioned alkenyl, crosslinking silyl, hydroxy, epoxy, amino and amide groups, among others.

The alkenyl-containing organic halide is not particularly restricted but may be one having the structure shown under the general formula (1):

$$R^4R^5C(X)—R^6—R^7—C(R^3)=CH_2 \qquad (1)$$

wherein $R^3$ is a hydrogen atom or a methyl group, $R^4$ and $R^5$ are the same or different and each is a hydrogen atom or an monovalent alkyl, aryl or aralkyl group containing up to 20 carbon atoms and $R^4$ and $R^5$ may be bound to each other at respective other termini, $R^6$ is —C(O)O— (ester group), —C(O)— (keto group) or an o-, m- or p-phenylene group, $R^7$ is a direct bond or a divalent organic group containing 1 to 20 carbon atoms, which may optionally contain one or more ether bonds, and X is chlorine, bromine or iodine.

As specific examples of the substituents $R^4$ and $R^5$, there maybe mentioned hydrogen, methyl, ethyl, n-propyl, isopropyl, butyl, pentyl, hexyl, etc. $R^4$ and $R^5$ may be bound to each other at respective other termini to form a cyclic skeleton.

As specific examples of the alkenyl-containing organic halide shown under the general formula (1), there may be mentioned the following:

$$XCH_2C(O)O(CH_2)_nCH=CH_2,$$

$$H_3CC(H)(X)C(O)O(CH_2)_nCH=CH_2,$$

$$(H_3C)_2C(X)C(O)O(CH_2)_nCH=CH_2,$$

$$CH_3CH_2C(H)(X)C(O)O(CH_2)_nCH=CH_2$$

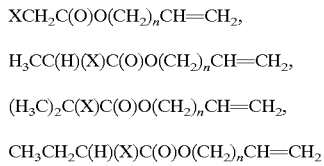

(in the above formulas, X is chlorine, bromine or iodine and n is an integer of 0 to 20);

$$XCH_2C(O)O(CH_2)_nO(CH_2)_mCH=CH_2,$$

$$H_3CC(H)(X)C(O)O(CH_2)_nO(CH_2)_mCH=CH_2,$$

$$(H_3C)_2C(X)C(O)O(CH_2)_nO(CH_2)_mCH=CH_2,$$

$$CH_3CH_2C(H)(X)C(O)O(CH_2)_nO(CH_2)_mCH=CH_2,$$

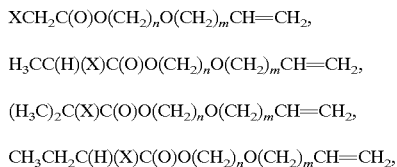

(in the above formulas, X is chlorine, bromine or iodine, n is an integer of 1 to 20 and m is an integer of 0 to 20);

o, m, p-XCH$_2$—C$_6$H$_4$—(CH$_2$)$_n$—CH=CH$_2$, o, m, p-CH$_3$C(H)(X)—C$_6$H$_4$—(CH$_2$)$_n$—CH=CH$_2$, o, m, p-CH$_3$CH$_2$C(H)(X)—C$_6$H$_4$—(CH$_2$)$_n$—CH=CH$_2$, (in the above formulas, X is chlorine, bromine or iodine and n is an integer of 1 to 20);

o, m, p-XCH$_2$—C$_6$H$_4$—(CH$_2$)$_n$—O—(CH$_2$)$_m$—CH=CH$_2$ o, m, p-CH$_3$C(H)(X)—C$_6$H$_4$—(CH$_2$)$_n$—O—(CH$_2$)$_m$—CH=CH$_2$ o, m, p-CH$_3$CH$_2$C(H)(X)—C$_6$H$_4$—(CH$_2$)$_n$—O—(CH$_2$)$_m$—CH=CH$_2$ (in the above formulas, X is chlorine, bromine or iodine, n is an integer of 1 to 20 and m is an integer of 0 to 20);

o, m, p-XCH$_2$—C$_6$H$_4$—O—(CH$_2$)$_n$—CH=CH$_2$ o, m, p-CH$_3$C(H)(X)—C$_6$H$_4$—O—(CH$_2$)$_n$—CH=CH$_2$ o, m, p-CH$_3$CH$_2$C(H)(X)—C$_6$H$_4$—O—(CH$_2$)$_n$—CH=CH$_2$ (in the above formulas, X is chlorine, bromine or iodine and n is an integer of 1 to 20);

o, m, p-XCH$_2$—C$_6$H$_4$—O—(CH$_2$)$_n$—O—(CH$_2$)$_m$—CH=CH$_2$ o, m, p-CH$_3$C(H)(X)—C$_6$H$_4$—O—(CH$_2$)$_n$—O—(CH$_2$)$_m$—CH=CH$_2$ o, m, p-CH$_3$CH$_2$C(H)(X)—C$_6$H$_4$—O—(CH$_2$)$_n$—O—(CH$_2$)$_m$—CH=CH$_2$ (in the above formulas, X is chlorine, bromine or iodine, n is an integer of 1 to 20 and m is an integer of 0 to 20).

As the alkenyl-containing organic halide, there may further be mentioned compounds represented by the general formula (2):

$$H_2C=C(R^3)—R^6—C(R^4)(X)—R^8—R^5 \qquad (2)$$

wherein $R^3$, $R^4$, $R^5$, $R^6$ and X are as defined above and $R^8$ is a direct bond, —C(O)O— (ester group), —C(O)— (keto group) or an o-, m- or p-phenylene group.

$R^6$ is a direct bond or a divalent organic group containing 1 to 20 carbon atoms (which may optionally contain one or more ether bonds) and, when it is a direct bond, the vinyl group is bound to the carbon to which the halogen is bound, to form an allyl halide. In this case, the carbon-halogen bond is activated by the neighboring vinyl group, so that it is not always necessary for $R^8$ to be a C(O)O group or a phenylene group, for instance, but it may be a direct bond. When $R^6$ is not a direct bond, for activating the carbon-halogen bond, $R^8$ is preferably a C(O)O group, C(O) group or phenylene group.

Specific examples of the compound of the general formula (2) are, among others, the following:

CH$_2$=CHCH$_2$X, CH$_2$=C(CH$_3$)CH$_2$X, CH$_2$=CHC(H)(X)CH$_3$,

CH$_2$=C(CH$_3$)C(H)(X)CH$_3$, CH$_2$=CHC(X)(CH$_3$)$_2$,

CH$_2$=CHC(H)(X)C$_2$H$_5$, CH$_2$=CHC(H)(X)CH(CH$_3$)$_2$,

CH$_2$=CHC(H)(X)C$_6$H$_5$, CH$_2$=CHC(H)(X)CH$_2$C$_6$H$_5$,

CH$_2$=CHCH$_2$C(H)(X)—CO$_2$R, CH$_2$=CH(CH$_2$)$_2$C(H)(X)—CO$_2$R,

CH$_2$=CH(CH$_2$)$_3$C(H)(X)—CO$_2$R, CH$_2$=CH(CH$_2$)$_8$C(H)(X)—CO$_2$R,

CH$_2$=CHCH$_2$C(H)(X)—C$_6$H$_5$, CH$_2$=CH(CH$_2$)$_2$C(H)(X)—C$_6$H$_5$,

CH$_2$=CH(CH$_2$)$_3$C(H)(X)—C$_6$H$_5$, (in the above formulas, X is chlorine, bromine or iodine and R is an alkyl group, aryl group or aralkyl group containing up to 20 carbon atoms).

Specific examples of the alkenyl-containing halogenated sulfonyl compound are as follows:

o, m, p-CH$_2$=CH—(CH$_2$)$_n$—C$_6$H$_4$—SO$_2$X, o, m, p-CH$_2$=CH—(CH$_2$)$_n$—O—C$_6$H$_4$—SO$_2$X, wherein, in each formula, X is chlorine, bromine or iodine and n is an integer of 0 to 20, and the like.

The above-mentioned crosslinking silyl-containing organic halide is not particularly restricted but includes, among others, those having a structure shown by the general formula (3):

$$R^4R^5C(X)—R^6—R^7—C(H)(R^3)CH_2—[Si(R^9)_{2-b}(Y)_bO]_m—Si(R^{10})_{3-a}(Y)_a \quad (3)$$

wherein R$^3$, R$^4$, R$^5$, R$^6$, R$^7$ and X are as defined above, R$^9$ and R$^{10}$ each represents an alkyl, aryl or aralkyl group containing up to 20 carbon atoms or a triorganosiloxy group of the formula (R')$_3$SiO— (in which R' is a monovalent hydrocarbon group containing 1 to 20 carbon atoms, and the three R' groups may be the same or different) and, when there are two or more R$^9$ or R$^{10}$ groups, they may be the same or different, Y represents a hydroxy group or a hydrolyzable group and, when there are two or more Y groups, they may be the same or different, a represents 0, 1, 2 or 3, b represents 0, 1 or 2 and m is an integer of 0 to 19, provided that the relation a +mb≧1 should be satisfied. Specific examples of the compound of the general formula (3) are as follows:

XCH$_2$C(O)O(CH$_2$)$_n$Si(OCH$_3$)$_3$,

CH$_3$C(H)(X)C(O)O(CH$_2$)$_n$Si(OCH$_3$)$_3$, (CH$_3$)$_2$C(X)C(O)O(CH$_2$)$_n$Si(OCH$_3$)$_3$,

XCH$_2$C(O)O(CH$_2$)$_n$Si(CH$_3$)(OCH$_3$)$_2$,

CH$_3$C(H)(X)C(O)O(CH$_2$)$_n$Si(CH$_3$)(OCH$_3$)$_2$, (CH$_3$)$_2$C(X)C(O)O(CH$_2$)$_n$Si(CH$_3$)(OCH$_3$)$_2$, (in the above formulas, X is chlorine, bromine or iodine and n is an integer of 0 to 20);

XCH$_2$C(O)O(CH$_2$)$_n$O(CH$_2$)$_m$Si(OCH$_3$)$_3$,

H$_3$CC(H)(X)C(O)O(CH$_2$)$_n$O(CH$_2$)$_m$Si(OCH$_3$)$_3$, (H$_3$C)$_2$C(X)C(O)O(CH$_2$)$_n$O(CH$_2$)$_m$Si(OCH$_3$)$_3$,

CH$_3$CH$_2$C(H)(X)C(O)O(CH$_2$)$_n$O(CH$_2$)$_m$Si(OCH$_3$)$_3$,

XCH$_2$C(O)O(CH$_2$)$_n$O(CH$_2$)$_m$Si(CH$_3$)(OCH$_3$)$_2$,

H$_3$CC(H)(X)C(O)O(CH$_2$)$_n$O(CH$_2$)$_m$Si(CH$_3$)(OCH$_3$)$_2$, (H$_3$C)$_2$C(X)C(O)O(CH$_2$)$_n$O(CH$_2$)$_m$Si(CH$_3$)(OCH$_3$)$_2$,

CH$_3$CH$_2$C(H)(X)C(O)O(CH$_2$)$_n$O(CH$_2$)$_m$Si(CH$_3$)(OCH$_3$)$_2$, (in the above formulas, X is chlorine, bromine or iodine, n is an integer of 1 to 20 and m is an integer of 0 to 20);

o, m, p-XCH$_2$—C$_6$H$_4$—(CH$_2$)$_2$Si(OCH$_3$)$_3$, o, m, p-CH$_3$C(H)(X)—C$_6$H$_4$—(CH$_2$)$_2$Si(OCH$_3$)$_3$, o, m, p-CH$_3$CH$_2$C(H)(X)—C$_6$H$_4$—(CH$_2$)$_2$Si(OCH$_3$)$_3$, o, m, p-XCH$_2$—C$_6$H$_4$—(CH$_2$)$_3$Si(OCH$_3$)$_3$, o, m, p-CH$_3$C(H)(X)—C$_6$H$_4$—(CH$_2$)$_3$Si(OCH$_3$)$_3$, o, m, p-CH$_3$CH$_2$C(H)(X)—C$_6$H$_4$—(CH$_2$)$_3$Si(OCH$_3$)$_3$, o, m, p-XCH$_2$—C$_6$H$_4$—(CH$_2$)$_2$—O—(CH$_2$)$_3$Si(OCH$_3$)$_3$, o, m, p-CH$_3$C(H)(X)—C$_6$H$_4$—(CH$_2$)$_2$—O—(CH$_2$)$_3$Si(OCH$_3$)$_3$, o, m, p-CH$_3$CH$_2$C(H)(X)—C$_6$H$_4$—(CH$_2$)$_2$—O—(CH$_2$)$_3$Si(OCH$_3$)$_3$, o, m, p-XCH$_2$—C$_6$H$_4$—O—(CH$_2$)$_3$Si(OCH$_3$)$_3$, o, m, p-CH$_3$C(H)(X)—C$_6$H$_4$—O—(CH$_2$)$_3$Si(OCH$_3$)$_3$, o, m, p-CH$_3$CH$_2$C(H)(X)—C$_6$H$_4$—O—(CH$_2$)$_3$Si(OCH$_3$)$_3$, o, m, p-XCH$_2$—C$_6$H$_4$—O—(CH$_2$)$_2$—O—(CH$_2$)$_3$Si(OCH$_3$)$_3$, o, m, p-CH$_3$C(H)(X)—C$_6$H$_4$—O—(CH$_2$)$_2$—O—(CH$_2$)$_3$Si(OCH$_3$)$_3$, o, m, p-CH$_3$CH$_2$C(H)(X)—C$_6$H$_4$—O—(CH$_2$)$_2$—O—(CH$_2$)$_3$Si(OCH$_3$)$_3$, (in the above formulas, X is chlorine, bromine or iodine), and the like.

As further examples of the crosslinking silyl-containing organic halide, there may be mentioned those having a structure represented by the general formula (4):

$$(R^{10})_{3-a}(Y)_aSi—[OSi(R^9)_{2-b}(Y)_b]_m—CH_2—C(H)(R^3)—R^{11}—C(R^4)(X)—R^8—R^5 \quad (4)$$

wherein R$^3$, R$^4$, R$^5$, R$^7$, R$^8$, R$^9$, R$^{10}$, a, b, m, X and Y are as defined above.

Specific examples of such compounds are as follows:

(CH$_3$O)$_3$SiCH$_2$CH$_2$C(H)(X)C$_6$H$_5$, (CH$_3$O)$_2$(CH$_3$)SiCH$_2$CH$_2$C(H)(X)C$_6$H$_5$, (CH$_3$O)$_3$Si(CH$_2$)$_2$C(H)(X)—CO$_2$R, (CH$_3$O)$_2$(CH$_3$)Si(CH$_2$)$_2$C(H)(X)—CO$_2$R, (CH$_3$O)$_3$Si(CH$_2$)$_3$C(H)(X)—CO$_2$R, (CH$_3$O)$_2$(CH$_3$)Si(CH$_2$)$_3$C(H)(X)—CO$_2$R, (CH$_3$O)$_3$Si(CH$_2$)$_4$C(H)(X)—CO$_2$R, (CH$_3$O)$_2$(CH$_3$)Si(CH$_2$)$_4$C(H)(X)—CO$_2$R, (CH$_3$O)$_3$Si(CH$_2$)$_9$C(H)(X)—CO$_2$R, (CH$_3$O)$_2$(CH$_3$)Si(CH$_2$)$_9$C(H)(X)—CO$_2$R, (CH$_3$O)$_3$Si(CH$_2$)$_3$C(H)(X)—C$_6$H$_5$, (CH$_3$O)$_2$(CH$_3$)Si(CH$_2$)$_3$C(H)(X)—C$_6$H$_5$, (CH$_3$O)$_3$Si(CH$_2$)$_4$C(H)(X)—C$_6$H$_5$, (CH$_3$O)$_2$(CH$_3$)Si(CH$_2$)$_4$C(H)(X)—C$_6$H$_5$, (in the above formulas, X is chlorine, bromine or iodine and R is an alkyl, aryl or aralkyl group containing up to 20 carbon atoms), and the like.

The above-mentioned hydroxy-containing organic halide or halogenated sulfonyl compound is not particularly restricted but includes, among others, compounds of the formula:

HO—(CH$_2$)$_n$—OC(O)C(H)(R)(X)

wherein X is chlorine, bromine or iodine, R is a hydrogen atom or an alkyl, aryl or aralkyl group containing up to 20 carbon atoms and n is an integer of 1 to 20.

The above-mentioned amino-containing organic halide or halogenated sulfonyl compound is not particularly restricted but includes, among others, compounds of the formula:

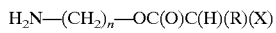

wherein X is chlorine, bromine or iodine, R is a hydrogen atom or an alkyl, aryl or aralkyl group containing up to 20 carbon atoms and n is an integer of 1 to 20.

The above-mentioned epoxy-containing organic halide or halogenated sulfonyl compound is not particularly restricted but includes, among others, compounds of the formula:

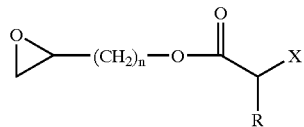

wherein X is chlorine, bromine or iodine, R is a hydrogen atom or an alkyl, aryl or aralkyl group containing up to 20 carbon atoms and n is an integer of 1 to 20.

When the above living radical polymerization is carried out using an organic halide or halogenated sulfonyl compound having two or more initiation sites as the initiator, vinyl polymers having halogen atoms at both termini are obtained. Specific examples of such initiator are:

o, m, p-  X—CH$_2$—C$_6$H$_4$—CH$_2$—X  (1-1)

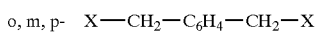 (1-2)

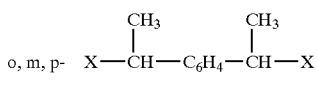 (1-3)

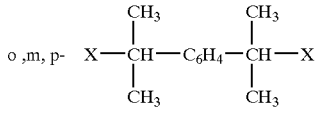 (1-4)

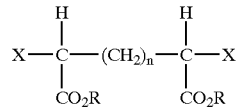 (1-5)

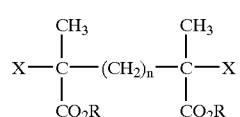 (1-6)

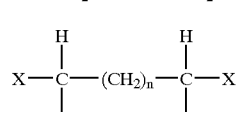 (1-7)

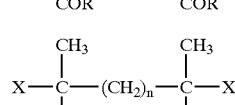 (1-8)

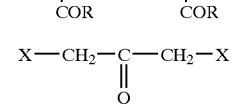 (1-9)

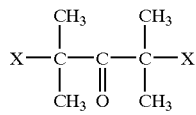 (1-10)

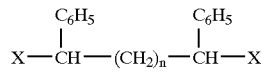 (1-11)

(in which R represents an alkyl group containing 1 to 20 carbon atoms, an aryl group containing 6 to 20 carbon atoms or an aralkyl group containing 7 to 20 atoms, C$_6$H$_4$ represents a phenylene group, n represents an integer of 0 to 20 and X represents chlorine, bromine or iodine atom.);

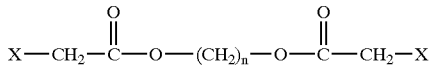 (1-12)

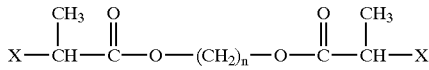 (1-13)

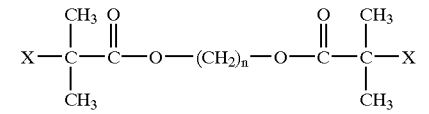 (1-14)

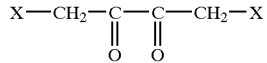 (1-15)

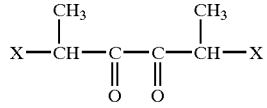 (1-16)

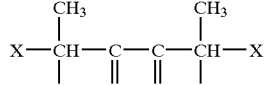 (1-17)

 (1-18)

 (1-19)

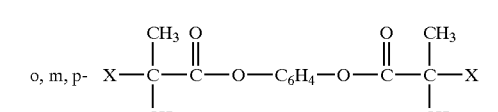 (1-20)

o, m, p-  X—SO$_2$—C$_6$H$_4$—SO$_2$—X  (1-21)

(in which R represents an alkyl group containing 1 to 20 carbon atoms, an aryl group containing 6 to 20 carbon atoms or an aralkyl group containing 7 to 20 atoms, C$_6$H$_4$ represents a phenylene group, n represents an integer of 0 to 20 and X represents chlorine, bromine or iodine); and so on.

Catalyst

The transition metal complex to be used as a catalyst in the atom transfer radical polymerization is not particularly restricted but those described in PCT/US 96/17780 can be utilized. Preferred among them are zero-valent copper, monovalent copper, divalent ruthenium, divalent iron and divalent nickel complexes. In particular, copper complexes are preferred. Specific examples of the monovalent copper compound are cuprous chloride, cuprous bromide, cuprous iodide, cuprous cyanide, cuprous oxide, cuprous perchlorate and the like. The tristriphenylphosphine complex of divalent ruthenium chloride ($RuCl_2(PPh_3)_3$) is also suited for use as the catalyst. When a ruthenium compound is used as the catalyst, an aluminum alkoxide is added as an activator. Further, bistriphenylphosphine-divalent iron complex ($FeCl_2(PPh_3)_2$), bistriphenylphosphine-divalent nickel complex ($NiCl_2(PPh_3)_2$) and bistributylphosphine-divalent nickel ($NiBr_2(PBu_3)_2$) complex are also suited as the catalysts.

When a copper compound is used as the catalyst, those ligands described in PCT/US 96/17780 can be used as the ligands for the copper compound. Amine ligands are preferred although the ligands are not particularly restricted. Thus, preferred ligands are 2,2'-bipyridyl and derivatives thereof, 1,10-phenanthroline and derivatives thereof, and aliphatic amines such as trialkylamines, tetramethylethylenediamine, pentamethyldiethylenetriamine and hexamethyl(2-aminoethyl)amine, and the like. Among them, aliphatic polyamines such as pentamethyldiethylenetriamine and hexamethyl(2-aminoethyl)amine are preferably used in the practice of the present invention.

Since the terminal halogen atom disappearance is influenced by the basicity of the polymerization system in the polymerization carried out under dehydrated conditions in the practice of the invention, the effects of the invention are great when amines, in particular aliphatic amines, are used as ligands.

The catalyst may be added to the polymerization apparatus in the form of a complex having catalyst activity or a transition metal compound, which is a precursor of the catalyst, and a ligand may be admixed in the polymerization apparatus for complex formation. According to the known atom transfer radical polymerization techniques, this complex formation procedure is carried out prior to addition of the initiator. On the contrary, the present invention discloses the technique which comprises adding the ligand to the polymerization system after addition of the initiator to effect complex formation with the catalyst precursor transition metal compound and thereby cause development of the catalytic activity and initiate the polymerization and/or control the catalytic activity.

When the polymerization is carried out in the presence of a nitrile compound in the practice of the present invention, it is preferred that, even in the ordinary technique for initiating atom transfer radical polymerization which comprises adding an initiator after complex formation, the complex precursor transition metal compound and nitrile compound be mixed together prior to ligand addition, since the dispersibility of the complex is increased by doing so.

Under the ordinary atom transfer radical polymerization conditions, the addition amount of such a ligand as mentioned above is determined by the number of coordination sites of the transition metal and the total number of coordinating groups of the ligand molecule or molecules and controlled in a manner such that both numbers are almost the same. Thus, for example, 2,2'-bipyridyl and derivatives thereof are added generally in an amount of two moles per mole of CuBr, and in the case of pentamethyldiethylenetriamine, the addition amount is one mole on the same basis. When the polymerization is initiated and/or the catalytic activity is controlled by ligand addition in the practice of the invention, it is preferred that the metal atom be in excess of the ligand, although this is not an essential requirement. The ratio between the coordination number and the number of ligand groups is preferably not less than 1.2, more preferably not less than 1.4, most preferably not less than 1.6, in particular not less than 2.

In the practice of the invention, the use of a transition metal complex in which the ligand is a nitrile compound from the beginning in lieu of the addition of a nitrile compound also gives the same effects. As such a complex, which is not particularly restricted, there may be mentioned those which are obtainable by adding a transition metal compound to a system in which a ligand nitrile compound occurs in excess and then removing the excess nitrile compound. $CuBr(NC-R)_n$ and $CuCl(NC-R)_n$ (R being a monovalent organic group, such as methyl, and n being an integer of not less than 1) are also examples.

Solvent, Additive

The polymerization according to the invention can be carried without using any solvent or in various solvents. The above solvents include, among others, hydrocarbon solvents such as benzene and toluene; ether solvents such as diethyl ether, tetrahydrofuran, diphenyl ether, anisole and dimethoxybenzene; halogenated hydrocarbon solvents such as methylene chloride, chloroform and chlorobenzene; ketone solvents such as acetone, methyl ethyl ketone and methyl isobutyl ketone; alcohol solvents such as methanol, ethanol, propanol, isopropanol, n-butyl alcohol and tert-butyl alcohol; nitrile solvents such as acetonitrile, propionitrile and benzonitrile; ester solvents such as ethyl acetate and butyl acetate; and carbonate solvents such as ethylene carbonate and propylene carbonate. These may be used singly or two or more of them may be used in admixture.

Among these solvents, aprotic solvents are preferred. Further, highly polar solvents are generally high in water absorbing ability and tend to accelerate the terminal group disappearance reaction and therefore are more effective in the polymerization under dehydrating conditions according to the invention. As a criterion, there may be mentioned the case in which a solvent having a relative dielectric constant at 25° C. of not less than 10 is used. Those nitrile compounds which are mentioned herein for use as additives in the practice of the invention may also be used as solvents.

It is preferred that these solvents or other additives to be added to the polymerization system coordinate with a metal compound used as the catalyst and form complexes having no catalytic activity but, upon addition of a ligand, the complexes are converted to active catalysts. Even when the solvent employed has no coordinating ability, the catalytic activity can be controlled by addition of a ligand. In a ligand-free state, however, such a metal compound as CuBr is insufficient in dispersibility and, in some instances, it adheres to the vessel wall, for instance and makes it difficult to stably control the activity. An example in which such requirements as mentioned above are satisfied is the combination of CuBr as the metal compound and a nitrile solvent as the solvent. In PCT/US 96/17780, acetonitrile is described as a preferred ligand to the polymerization catalyst but, in fact, it has been confirmed that the acetonitrile complex of CuBr has no polymerization activity. Studies made by the present inventors, however, have revealed that this complex has high crystallinity and can be well dispersed in the polymerization system by adequate stirring though in heterogeneously. And, when such a ligand as pentamethyldiethylenetriamine is added, an active complex are quickly formed to thereby catalyze the polymerization.

Molecular Weight and Molecular Weight Distribution

Since it is produced under better control by atom transfer radical polymerization, the polymer A generally has a molecular weight distribution, namely the ratio of weight average molecular weight to number average molecular weight as determined by gel permeation chromatography, of less than 1.8, preferably not more than 1.7, more preferably not more than 1.6, still more preferably not more than 1.5, in particular not more than 1.4 and most preferably not more than 1.3, although these values have no restrictive meaning. In the practice of the invention, the GPC determination is generally carried out on a polystyrene gel column using chloroform as the mobile phase, and the number average molecular weight can be determined in terms of polystyrene equivalent. Though it is not particularly restricted, the number average molecular weight is preferably within the range of 500 to 1,000,000, more preferably 1,000 to 100,000.

Terminal Halogen-containing Group

The terminal halogen-containing group of polymer A has a structure represented, for example, by the following general formula:

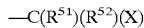

—C($R^{51}$)($R^{52}$)(X)

wherein $R^{51}$ and $R^{52}$ each represents a group bound to an ethylenically unsaturated bond of a vinyl monomer and X represents chlorine, bromine or iodine.

The case in which either of $R^{51}$ and $R^{52}$ is a hydrogen atom, namely a secondary halogen group, is preferred among others. For realizing this, mention may be made of the polymerization of such a monomer as an acrylic monomer and, further, of the technique of adding a monomer giving such a terminal structure only at the terminal stage of polymerization and cause it to polymerize.

<Description of Compound B Having a Carboxylic Acid Group>

In the following, the compound B having a carboxylic acid group, which is to substitute for the terminal halogen atom of the halogen-terminated polymer A obtained by atom transfer radical polymerization is described.

The carboxylic acid group-containing compound includes a polymers, polymers further having carboxylic acid groups in side chains thereof, and carboxylic acid-containing compounds having two or more carboxylic acid groups, for instance.

As the carboxylic acid group-containing compound, there may be mentioned reaction products from a cyclic acid anhydride and an functional group-containing alcohol and, as the functional group, there may be mentioned a group selected from the group consisting of alkenyl, hydroxy, amino and epoxy groups. The cyclic acid anhydride may be selected from the group consisting of succinic anhydride, phthalic anhydride and glutaric anhydride.

Carboxylic Acid Group

The carboxylic acid group includes carboxylic acids and carboxylic acid salts, with carboxylic acid salts being preferred.

The carboxylic acid salts are represented by the following general formula:

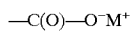

—C(O)—O⁻M⁺ wherein M⁺ represents an alkali metal ion or a quaternary ammonium ion.

M⁺ is the counter ion of the carboxylic acid salt and, as species of M⁺, there may be mentioned alkali metal ions, specifically the lithium ion, sodium ion and potassium ion, and quaternary ammonium ions. As the quaternary ammonium ions, there may be mentioned the tetramethylammonium ion, tetraethylammonium ion, trimethylbenzylammonium ion, trimethyldodecylammonium ion, tetrabutylammonium ion and dimethylpiperidinium ion, among others. Among these, the sodium ion and potassium ion are preferred and the potassium ion is more preferred, without any restrictive meaning, however.

The carboxylic acid group is used as the precursor of the carboxylic acid salt group.

The carboxylic acid salt group can be prepared by reacting the carboxylic acid group with a base. The base may be any of various bases. Examples are metal alkoxides such as sodium methoxide, potassium methoxide, lithium methoxide, sodium ethoxide, potassium ethoxide, lithium ethoxide, sodium tert-butoxide and potassium tert-butoxide; carbonate salts such as sodium carbonate, potassium carbonate, lithium carbonate and sodium hydrogen carbonate; hydroxides such as sodium hydroxide and potassium hydroxide; hydrides such as sodium hydride and potassium hydride; organolithium compounds such as methyllithium, ethyllithium, n-butyllithium, tert-butyllithium, lithium diisopropylamide and lithium hexamethyldisilazide; amines such as ammonium, trimethylamine, triethylamine, tributylamine, tetramethylethylenediamine and pentamethyldiethylenetriamine; pyridine compounds such as pyridine and picoline; and the like.

As the solvent to be used in the neutralization of the above precursor compound with a base, there may be mentioned, among others, hydrocarbon solvents such as benzene and toluene; halogenated hydrocarbon solvents such as methylene chloride, chloroform and chlorobenzene; ether solvents such as diethyl ether, dioxane, tetrahydrofuran, diphenyl ether, anisole and dimethoxybenzene; ester solvents such as ethyl acetate and butyl acetate; ketone solvents such as acetone, methyl ethyl ketone and methyl isobutyl ketone; alcohol solvents such as methanol, ethanol, propanol, isopropanol, n-butyl alcohol and tert-butyl alcohol; nitrile solvents such as acetonitrile, propionitrile and benzonitrile; amide solvents such as dimethylfomamide, dimethylacetamide and hexamethylphosphoric triamide; sulfoxide solvents such as dimethyl sulfoxide; carbonate solvents such as ethylene carbonate and propylene carbonate; and water. These may be used singly or two or more of them may be used in admixture.

Those salts in which M+ is a quaternary ammonium ion can be obtained by directly reacting the carboxylic acid group with an alkylamine or pyridine compound or by preparing a salt in which M⁺ is an alkali metal ion and thereafter reacting the resulting salt with a quaternary ammonium halide. As the quaternary ammonium halide, there may be mentioned, for example, tetramethylammonium halides, tetraethylammonium halides, trimethylbenzylammonium halides, trimethyldodecylammonium halides and tetrabutylammonium halides.

Carboxylic Acid Group-containing Polymer

As the carboxylic acid group-containing polymer, there may be mentioned polymers and polymers further having carboxylic acid groups in side chains thereof.

The polymers further having a carboxylic acid group in a side chain thereof can be prepared by reacting a vinyl polymer having a carboxyl group or acid anhydride structure with a base. As such vinyl polymer, there may be mentioned, among others, polymers of a vinyl monomer having a carboxyl group or acid anhydride structure, such as (meth) acrylic acid; maleic anhydride, maleic acid or a maleic acid monoalkyl ester; fumaric acid or a fumaric acid monoalkyl ester; or cinnamic acid, and vinyl copolymers comprising one or more of these vinyl monomers as one of the constituent units thereof.

As the carboxylic acid-terminated polymer, there may be mentioned, among others, polyesters, and polymers derived by deprotection from polymers obtained by atom transfer radical polymerization using an initiator having a carboxylic acid group protected with a protective group such as a tert-butyl and silyl group.

Compound Having a Plurality of Carboxylic Acid Groups

As the carboxylic acid-containing compound having a plurality of carboxylic acid groups, there may be mentioned carboxylic acid salts represented by the following general formula:

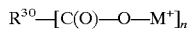

$$R^{30}\text{—[C(O)—O—M}^+\text{]}_n$$

wherein $R^{30}$ represents a direct bond or an organic group containing 1 to 20 carbon atoms with a valence n, which may contain one or more ether and/or ester bonds, and $M^+$ represents an alkali metal ion or a quaternary ammonium ion.

In the above general formula, $R^{30}$ is a direct bond or an organic group containing 1 to 20 carbon atoms with a valence n, which may contain one or more ether and/or ester bonds. Further, $R^{30}$ may contain an unsaturated double bond or a benzene ring. $R^{30}$ may be substituted by a functional group such as hydroxy, amino, nitro, cyano, etc. As specific examples, there may be mentioned a direct bond; —CH$_2$—, —CH(CH$_3$)—, —C(CH$_3$)$_2$—, —(CH$_2$)$_2$—, —(CH$_2$)$_3$—, —(CH$_2$)$_4$—, —(CH$_2$)$_n$— (n being an integer of 5 to 20); —CH$_2$—CH(OH)—, —CH(OH)—CH(OH)—, —CH=CH— and like divalent organic groups. The following polyvalent organic groups may further be mentioned as specific examples:

6-1

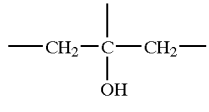

6-2

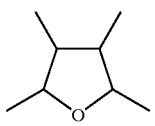

6-3

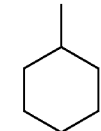

6-4

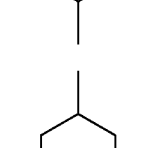

6-5

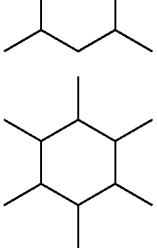

6-6

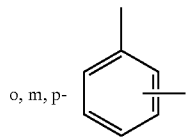

6-7

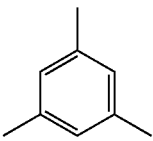

6-8

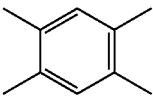

As the precursor of a carboxylic acid salts of the above general formula, a polycarboxylic acid having two or more carboxyl groups per molecule may be used. Specific examples are oxalic acid, malonic acid, succinic acid, glutaric acid, adipic acid, HO$_2$C—(CH$_2$)$_n$—CO$_2$H (n being an integer of 5 to 20), maleic acid, fumaric acid, malic acid, tartaric acid, citric acid and the like. Further, the polycarboxylic acids shown below can be used.

7-1

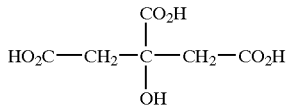

7-2

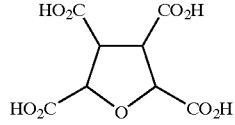

7-3

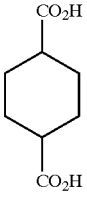

7-4

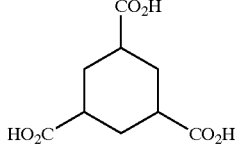

7-5

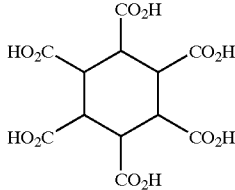

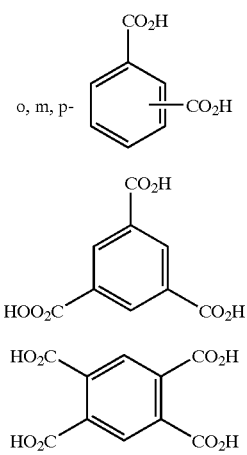

7-6

7-7

7-8

Further usable as the above precursor are acid anhydrides and halides of the above-mentioned polycarboxylic acids.

Functional Group-containing Carboxylic Acid Salt Compound

The functional group-containing carboxylic acid salt compound is not particularly restricted but includes compounds represented by the following general formula which have a functional group Y:

$$M^+O^-\text{---}C(O)\text{---}R^{40}\text{---}Y^1$$

wherein $R^{40}$ represents a direct bond or a divalent organic group containing 1 to 20 carbon atoms, which may optionally contain one or more ether and/or ester bonds, $Y^1$ represents a hydroxy group (—OH), an amino group (—NH$_2$), a carboxyl group (—CO$_2$H), carboxylate group (—CO$_2$M$^+$) or an alkenyl group represented by —C(R)=CH$_2$ (where R represents a hydrogen atom or an alkyl group containing 1 to 10 carbon atoms, an aryl group containing 6 to 10 carbon atoms or an aralkyl group containing 7 to 10 carbon atoms) and M$^+$ represents an alkali metal ion or a quaternary ammonium ion.

$R^{40}$ is specifically a direct bond or a divalent organic group containing 1 to 20 carbon atoms, which may optionally contain one or more ether bond. Specific examples of the divalent organic group containing 1 to 20 carbon atoms are —CH$_2$—, —(CH$_2$)$_2$—, —(CH$_2$)$_3$—, —(CH$_2$)$_4$—, —(CH$_2$)$_n$— (n being an integer of 5 to 20) and like alkylene groups. $R^{41}$ may contain an unsaturated double bond or a benzene ring. Further, $R^{41}$ may contain an ether, ester or amide bond.

M$^+$ is as mentioned above.

Carboxylic acids having a functional group $Y^{12}$ are used as the precursor of the carboxylic acid salts represented by the above general formula. $Y^{12}$ is a hydroxy group (—OH), an amino group (—NH$_2$), a carboxyl group (—CO$_2$H) or an alkenyl group represented by —C(R)=CH$_2$ (where R represents a hydrogen atom or an alkyl group containing 1 to 10 carbon atoms, an aryl group containing 6 to 10 carbon atoms or an aralkyl group containing 7 to 10 carbon atoms).

The hydroxy-containing carboxylic acid compound is not particularly restricted but, for example, the compounds shown below are used: HO—(CH$_2$)$_n$—CO$_2$H (n being an integer of 1 to 20), H$_3$C—CH(OH)—CO$_2$H, H$_3$C—CH(OH)CH$_2$—CO$_2$H, o-, m- or p-HO—C$_6$H$_4$—CO$_2$H, and o-, m- or p-HO—(CH$_2$)$_n$—C$_6$H$_4$—(CH$_2$)$_m$—CO$_2$H (n and m each being an integer of 0 to 14 and n+m≦14).

The amino-containing carboxylic acid compound is not particularly restricted but amino acids known in the art may be used. Specific examples are: H$_2$N—(CH$_2$)$_n$—CO$_2$H (n being an integer of 1 to 20), H$_3$C—CH(NH$_2$)—CO$_2$H, H$_3$C—CH(NH$_2$)CH$_2$—CO$_2$H, C$_6$H$_5$—CH(NH$_2$)—CO$_2$H and the like.

The alkenyl-containing carboxylic acid compound is not particularly restricted but, for example, the following compounds may be used. As specific examples, there may be mentioned H$_2$C=CH—C(O)—OH, H$_2$C=C(CH$_3$)—C(O)—OH, H$_2$C=CH—CH$_2$—C(O)—OH, H$_2$C=CH—(CH$_2$)$_n$—C(O)—OH (n being an integer of 0 to 20), H$_2$C=CH—(CH$_2$)$_n$—OC(O)—(CH$_2$)$_m$—C(O)—OH (m and n being the same or different and each being an integer of 0 to 19), o-, m- or p-H$_2$C=CH—C$_6$H$_4$—C(O)—OH, o-, m- or p-H$_2$C=CH—CH$_2$—C$_6$H$_4$—C(O)—OH, o-, m- or p-H$_2$C=CH—CH$_2$—O—C$_6$H$_4$—C(O)—OH, o-, m- or p-H$_2$C=CH—(CH$_2$)$_n$—OC(O)—C$_6$H$_4$—C(O)—OH (n being an integer of 0 to 13) and the like.

The carboxyl or carboxylate group-containing precursor of the carboxylic acid salt compound is not particularly restricted but, for example, divalent carboxylic acid compounds and the like are used. As specific examples, there may be mentioned oxalic acid, malonic acid, succinic acid, glutaric acid, adipic acid, HO$_2$C—(CH$_2$)$_n$—CO$_2$H (n being an integer of 5 to 20), maleic acid, fumaric acid, malic acid, tartaric acid, phthalic acid, isophthalic acid, terephthalic acid and naphthalenedicarboxylic acid. Halides of these and cyclic acid anhydrides such as succinic anhydride, maleic anhydride and phthalic anhydride may also be used.

Carboxylic Acid Group-containing Compound Obtainable by Reacting a Cyclic Acid Anhydride with a Functional Group-containing Alcohol By reacting a cyclic acid anhydride with a functional group-containing alcohol, the anhydride readily undergoes ring opening to give the corresponding precursor carboxylic acid compound. The cyclic acid anhydride is not particularly restricted but, for example, succinic anhydride, glutaric anhydride, maleic anhydride, cyclohexanedicarboxylic anhydride, phthalic anhydride and the like may be mentioned. Among these, succinic anhydride, glutaric anhydride and phthalic anhydride are preferred and phthalic anhydride is particularly preferred.

The functional group-containing alcohol mentioned above is not particularly restricted but may be a compound represented by the following general formula:

HO—R—Z wherein R represents a divalent organic group containing 1 to 20 carbon atoms and Z represents a functional group.

The functional group Z is not particularly restricted but, for example, is an alkenyl group [—C(R')=CH$_2$; R' being hydrogen or methyl], hydroxy, amino, epoxy or the like. As specific examples of the functional group-containing alcohol, there may be mentioned, among others, alkenyl-containing alcohols such as allyl alcohol, butenyl alcohol, pentenyl alcohol and hexenyl alcohol; diols such as ethylene glycol, propylene glycol and cyclohexanediol; amino-containing alcohols such as ethanolamine, aminopropanol and aminobutanol; and epoxy-containing alcohols such as glycidol, among others.

When an amino- or hydroxy-containing compound is reacted with a polymer terminus, the compound as it is may be subjected to the reaction but, in case such group may influence on the polymer terminus, the compound having a protective group may be used. As the protective group, there maybe mentioned acetyl, silyl, alkoxy and like groups.

By reacting the above carboxylic acid compound with a base, it is possible to obtain an alkali metal salt or ammonium salt.

The method of preparing the alkali metal salt is as already mentioned hereinabove.

<Quantity Ratio Between the Carboxylic Acid Salt Group and Halogen Atom (Coupling)>

In carrying out the coupling reaction, the carboxylic acid salt is used preferably in an amount such that the amount of the carboxylic acid salt group be not more than equivalent to the amount of the terminal halogen atom. When the carboxylic acid salt is used in an amount in excess of the equivalent amount, the mutual coupling reaction between polymer termini may not proceed to a sufficient extent but may give a carboxylate-terminated polymer in some instances. In cases where a carboxylate-terminated polymer is to be obtained, the use in excess of the equivalent amount is appropriate. If not, however, the use in excess of the equivalent amount is to be avoided. When the above amount is smaller, there may remain polymer termini that have failed to couple but this produces no problem if it is intended to effect only partial coupling. Accordingly, the carboxylic acid salt represented by the above general formula (3) is preferably used in an amount of 0.5 to 1.0 time, more preferably 0.8 to 1.0 time, still more preferably 0.9 to 1.0 time, as expressed in terms of the carboxylate group amount relative to the terminal halogen. In cases where the compound having a plurality of carboxylic acid salt groups is low in solubility, the solubility thereof may increase as a result of binding thereof with the polymer after reaction of the first carboxylic acid salt group, hence the reactivity of the second and further groups may increase in certain cases. In such cases, the use of the carboxylic acid salt in an amount in excess of the equivalent amount also can allow the coupling reaction to proceed satisfactorily.

<Quantity Ratio Between the Carboxylic Acid Salt Group and Halogen Group (Grafting)>

The polymer B is used preferably in an amount such that the amount of the carboxylate group of polymer B is not less than the equivalent amount relative to the amount of the halogen group of polymer A. This is because, when the amount is less than the equivalent amount, the polymer A partially remains unreacted. On the other hand, it is possible to retain the unreacted portion of the carboxylate group as a hydrophilic group in the copolymer by causing the amount of the carboxylate group to be in excess of the amount of the halogen group. Thus, it is possible to synthesize amphophilic polymers by adjusting the quantity ratio between the carboxylate group and halogen group.

<Reaction Conditions>

The solvent to be used in the conversion reaction of the terminal halogen atom of polymer A includes, among others, hydrocarbon solvents such as benzene and toluene; halogenated hydrocarbon solvents such as methylene chloride, chloroform and chlorobenzene; ether solvents such as diethyl ether, dioxane, tetrahydrofuran, diphenyl ether, anisole and dimethoxybenzene; ester solvents such as ethyl acetate and butylacetate; ketone solvents such as acetone, methyl ethyl ketone and methyl isobutyl ketone; alcohol solvents such as methanol, ethanol, propanol, isopropanol, n-butyl alcohol and tert-butyl alcohol; nitrile solvents such as acetonitrile, propionitrile and benzonitrile; amide solvents such as dimethylfomamide, dimethylacetamide and hexamethylphosphoric triamide; sulfoxide solvents such as dimethyl sulfoxide; carbonate solvents such as ethylene carbonate and propylene carbonate; and water. These may be used singly or two or more of them maybe used in admixture. The reaction temperature is not particularly restricted but preferably is 0° C. to 150° C.

<Reaction in the Presence of a Nitrogen Atom-containing Compound>

Carboxylic acid salts are generally low in solubility in common organic solvents and, depending on the solvent, produce a problem, namely the substitution reaction of a polymer terminus will not proceed at all or proceeds only very slowly. As a result of intensive studies made by the present inventors in search of means of solving this problem, it was found that this reaction can be accelerated by causing a nitrogen atom-containing compound to coexist in the reaction system.

The nitrogen atom-containing compound is not particularly restricted but mention may be made of ammonia; aliphatic amines such as trimethylamine, triethylamine, tripropylamine, tributylamine, diisopropylethylamine, tetramethylethylenediamine and pentamethyldiethylenetriamine; alicyclic amines such as dimethylcyclohexylamine, diethylcyclohexylamine and methyldicyclohexylamine; aromatic amines such as dimethylaniline and diethylaniline; and heterocyclic nitrogen bases such as methylpyrazole, phenylpyrazole, methylimidazole, phenylimidazole, pyridine and picoline, among others. These maybe used singly or two or more of them maybe used in admixture.

The terminal conversion reaction of polymer A can be carried out by reacting the polymer A obtained after purification with a carboxylate group-containing compound and a nitrogen atom-containing compound. It is also possible to carry out the reaction by directly adding a carboxylate group-containing compound and a nitrogen atom-containing compound to the polymerization system for producing the polymer A. Thus, it is possible to omit the step of isolating and purifying the polymer A.

When the polymer A is produced by atom transfer radical polymerization using an amine compound or pyridine compound as the ligand, the ligand as it is can be used as the nitrogen atom-containing compound. The amine compound or pyridine compound is not particularly restricted but those already mentioned hereinabove may be used. In this case, too, the conversion reaction can be effected directly in the polymerization system as well. When the conversion reaction is carried out directly in the polymerization system, a carboxylate-containing compound is added directly to the polymerization system. It produces no problem to add a nitrogen atom-containing compound, namely a ligand, to the reaction system for accelerating the reaction.

<Polymer>

The polymer obtainable by the production method of the present invention includes graft polymers, gels, coupled polymers, terminally functional polymers, in particular carboxylic acid group-terminated polymers, and so on.

As specific examples, there may be mentioned vinyl polymers having a group of the general formula (5) given below within the molecular chain thereof.

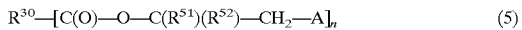

$$R^{30}-[C(O)-O-C(R^{51})(R^{52})-CH_2-A]_n \qquad (5)$$

wherein $R^{51}$, $R^{52}$ and $R^{30}$ are as defined above, n is an integer of not less than 1 and A represents a vinyl polymer.

Specific examples of $R^{30}$ in the carboxylic acid salts represented by the general formula include all of those mentioned hereinabove.

As the carboxylic acid group-terminated polymer, there may be mentioned vinyl polymers having a terminal structure represented by the following general formula:

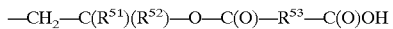

$$-CH_2-C(R^{51})(R^{52})-O-C(O)-R^{53}-C(O)OH$$

wherein $R^{51}$ and $R^{52}$ are as defined above and $R^{53}$ represents a direct bond or a divalent organic group containing 1 to 20 carbon atoms.

In the above general formula, $R^{53}$ is a direct bond or a divalent organic group containing 1 to 20 carbon atoms. Specific examples of the divalent organic group containing 1 to 20 carbon atoms are —$CH_2$—, —$(CH_2)_2$—, —$(CH_2)_3$—, —$(CH_2)_4$—, —$(CH_2)_n$— (n being an integer of 5 to 20) and like alkylene groups. $R^{53}$ may contain an unsaturated double bond or a benzene ring. Further, $R^{53}$ may contain an ether, ester or amide bond. Furthermore, $R^{53}$ may be substituted by a functional group such as a hydroxy, amino, nitro or cyano group.

<Curable Composition Comprising the Carboxyl-terminated Polymer as a Component>

The carboxyl-terminated vinyl polymer produced by the production method of the present invention can be used in a curable composition comprising the same as a component.

This curable composition comprises the following two components as essential components: the carboxyl-terminated vinyl polymer and a compound having two or more functional groups capable of reacting with the carboxyl group.

The first component carboxyl-terminated (meth)acrylic polymer may comprise a single species or a mixture of two or more species.

The second component compound having two or more functional groups capable of reacting with the carboxyl group is not particularly restricted but includes, among others, epoxy-containing compounds such as epoxy resins, hydroxy-containing compounds such as polyfunctional alcohols, amino-containing compounds such as polyfunctional amines and isocyanato-containing compounds such as polyvalent isocyanate compounds.

The epoxy resins are not particularly restricted but may be any ones known in the art. Thus, as specific examples, there may be mentioned epoxide resins based on the reaction products from bisphenol A or bisphenol F and epichlorohydrin; di- or polyglycidyl ethers of polyhydric aliphatic alcohols such as 1,4-butanediol or of polyalkylene glycols such as propylene glycol; di- or polyglycidyl ethers of aliphatic polyols such as 2,2-bis(p-hydroxycyclohexyl) propane; di- or polyglycidyl ethers of polyhydric phenols such as resorcinol and 2,2-bis(4'-hydroxy-3',5'-dibromophenyl)propane; di- or polyglycidyl ethers of phenol-formaldehyde condensation products obtainable under acidic conditions, for example phenol novolaks and cresol novolaks; polyglycidyl ethers of polybasic carboxylic acids such as phthalic acid, terephthalic acid, tetrahydrophthalic acid and hexahydrophthalic acid; N-glycidyl derivatives of amines, amides and heterocyclic nitrogen bases, for example N,N-diglycidylaniline, N,N-diglycidyltoluidine, N,N,N',N'-tetraglycidyl-bis-(p-aminophenyl)methane, triglycidylisocyanurate, N,N'-diglycidylethyleneurea, N,N'-diglycidyl-5,5-dimethylhydantoin and N,N'-diglycidyl-5,5-dimethyl-6-isopropyl-5,6-dihydrouracil.

The reaction temperature is not particularly restricted. The reaction can be carried out at 0° C. to 200° C., preferably at 50° C. to 150° C. For promoting the curing, a catalyst known in the art may be used. Particularly advantageous catalysts are quaternary ammonium compounds or quaternary phosphonium compounds, for example tetramethylammonium chloride, tetrabutylphosphonium chloride and tetrabutylphosphonium acetate.

The polyfunctional alcohols are not particularly restricted but, there may be mentioned, for example, aliphatic glycols such as ethylene glycol, diethylene glycol, propylene glycol, dipropylene glycol, 1,3-butanediol, 1,4-butanediol, 1,5-pentanediol, 1,6-hexanediol, neopentyl glycol, 2-ethyl-1,3-hexanediol, glycerol and trimethylolpropane, alicyclic glycols such as 1,4-cyclohexaneglycol, and aromatic glycols such as xylylene glycol, 1,4-dihydroxyethylbenzene and hydrogenated bisphenol A.

The reaction temperature is not particularly restricted. The reaction can be carried out at 0° C. to 200° C., preferably at 50° C. to 150° C.

The polyfunctional amines are not particularly restricted but include aliphatic amines such as 1,4-diaminobutane, 1,4-diaminobutane, 1,2-diamino-2-methylpropane, 1,5-diaminopentane, 2,2-dimethyl-1,3-propanediamine, 1,6-hexanediamine, diethylenetriamine and triethylenetetraamine; and aromatic amines such as metaxylylenediamine, o-, m- or p-phenylenediamine, o-tolidine, m-toluylenediamine, diaminonaphthalane, methylenedianiline and diaminobenzophenone.

The reaction temperature is not particularly restricted. The reaction can be carried out at 0° C. to 200° C., preferably at 50° C. to 150° C.

The polyvalent isocyanate compounds are not particularly restricted but include those known in the art. Thus, for example, mention may be made of isocyanate compounds such as 2,4-tolylene diisocyanate, 2,6-tolylene diisocyanate, 4,4'-diphenylmethanediisocyanate, hexamethylene diisocyanate, xylylene diisocyanate, metaxylylene diisocyanate, 1,5-naphthalenediisocyanate, hydrogenated diphenylmethanediisocyanate, hydrogenated tolylene diisocyanate, hydrogenated xylylene diisocyanate, isophoronediisocyanate and such triisocyanates as Ipposha Yushi's B-45, biuret polyisocyanate compounds such as Sumidur N (product of Sumitomo Bayer Urethane), isocyanurate ring-containing polyisocyanate compounds such as Desmodur IL and HL (product of Bayer A. G.) and Coronate EH (product of Nippon Polyurethane Industry), adduct polyisocyanate compounds such as Sumidur L (product of Sumitomo Bayer Urethane), adduct polyisocyanate compounds such as Coronate HL (product of Nippon Polyurethane Industry) and the like. Blocked polyisocyanates may also be used. These may be used singly or two or more of them may be used combinedly.

The reaction temperature is not particularly restricted. The reaction can be carried out at 0° C. to 200° C., preferably at 50° C. to 150° C.

For promoting the curing reaction between the carboxyl-terminated vinyl polymer and the compound having two or more isocyanate groups, which constitute the composition of the present invention, such a known catalyst as an organotin compound or a tertiary amine may be added as necessary. As specific examples of the organotin compound, there may be mentioned stannous octoate, dibutyltin diacetate, dibutyltin dilaurate, dibutyltin mercaptides, dibutyltin thiocarboxylates, dibutyltin dimaleate and dioctyltin thiocarboxylates, among others. As the tertiary amine catalyst, there may be mentioned, for example, triethylamine, N,N-dimethylcyclohexylamine, N,N,N',N'-tetramethyl-ethylenediamine, N,N,N',N'-tetramethylpropane-1,3-diamine, N,N,N',N'-tetramethylhexane-1,6-diamine, N,N,N',N",N"-pentamethyldiethylenetriamine, N,N,N',N",N"-pentamethyldipropylenetriamine, tetramethylguanidine, triethylenediamine, N,N'-dimethylpiperazine, N-methylmorpholine, 1,2-dimethylimidazole, dimethylaminoethanol, dimethylaminoethoxyethanol, N,N, N'-trimethylaminoethylethanolamine, N-methyl-N'-(2-hydroxyethyl)piperazine, N-(2-hydroxyethyl)morpholine, bis(2-dimethylaminoethyl)ether, ethylene glycol bis(3-dimethyl)aminopropyl ether and the like.

The above two components according to the present invention, when admixed with a curing catalyst as necessary and cured, give a uniform curing product with a high level of core curing.

The polymer produced according to the invention can be utilized as a plastic molding material, plastic shock resistance improving agent, physical property modifier for lubricants, or thermoplastic elastomer, for instance. In case of a functional group-terminated polymer, it can be converted to a cured product by utilizing the functional group as it is or by converting the functional group to another functional group such as a condensable silyl group and causing the same to undergo a crosslinking reaction. Specific fields of application of the polymer include sealing compositions, adhesives, binders, elastic adhesives, coatings, powder coating compositions, foamed products, potting agents for use in electric and electronic fields, films, gaskets, various moldings and artificial marble, among others.

EXAMPLES

In the following, several specific examples of this invention are described, together with a comparative example. It is to be noted that the following examples are by no means limitative of the scope of the present invention.

In the following examples, the "number average molecular weight" and "molecular weight distribution (ratio of weight average molecular weight to number average molecular weight)" were determined and calculated based on standard polystyrene equivalent values as found by gel permeation chromatography (GPC). The GPC column used was a column packed with a crosslinked polystyrene gel and the GPC solvent used was chloroform.

Production Example 1

Synthesis of Br Group-terminated poly(butyl acrylate)(1)

A 2-liter separable flask equipped with a reflux condenser and a stirrer was charged with CuBr (5.54 g, 38.6 mmol) and the reactor inside was purged with nitrogen. Acetonitrile (73.8 mL) was added and the contents were stirred on an oil bath at 70° C. for 30 minutes. Thereto were added butyl acrylate (132 g), methyl 2-bromopropionate (14.4 mL, 0.129 mol) and pentamethyldiethylenetriamine (4.69 mL, 0.022 mol) to thereby initiate the reaction. While heating at 70° C. with stirring, butyl acrylate (528 g) was added dropwise continuously over 90 minutes, followed by further 80 minutes of heating with stirring.

The reaction mixture was diluted with toluene and passed through an activated alumina column. The volatile matter was then distilled off under reduced pressure to give poly (butyl acrylate) having a Br group at one terminus (polymer [1]). The polymer [1] had a number average molecular weight of 5,800 and a molecular weight distribution of 1.14.

Production Example 2

Synthesis of a polycarboxylic Acid Salt tert-Butoxypotassium (7.68 g, 68.4 mmol) was dissolved in methanol (100 mL) and then adipic acid (5.0 g, 34.2 mmol) was added to the solution. After stirring the reaction mixture at room temperature for a while, the mixture was concentrated and the residue dried to give dipotassium adipate.

Example 1

Introduction of a Carboxylic Acid Salt Group

A flask equipped with a reflux condenser was charged with the polymer [1] obtained in Production Example 1, an excess of the dipotassium adipate obtained in Production Example 2 and dimethylacetamide, and the contents were heated at 100° C. for at least 10 hours with stirring. The reaction mixture was concentrated under reduced pressure and the concentrate was diluted with toluene. The insoluble matter was filtered off and the filtrate was concentrated under reduced pressure to give a polymer.

As a result of $^1$H NMR analysis and GPC measurement, it was found that the terminal Br group of polymer [1] had been converted and the carboxylic acid salt group had been introduced into the polymer terminus.

Example 2

Coupling of the Br Group-terminated Polymer

A-500 mL flask equipped with a reflux condenser was charged with the polymer [1] (10 g) obtained in Production Example 1, the dipotassium adipate (191 mg) obtained in Production Example 2 and dimethylacetamide (10 mL), and the contents were heated at 70° C. for 5 hours with stirring. The dipotassium adipate (540 mg) was further added and the mixture was heated at 100° C. for further 10 hours with stirring. The reaction mixture was concentrated under reduced pressure, and the concentrate was diluted with toluene. The insoluble matter was filtered off and the filtrate was concentrated under reduced pressure to give a polymer. Conversion of the Br group was confirmed by $^1$H NMR analysis and formation of a macromolecular product (peak top molecular weight=12,500) was confirmed by GPC measurement. These findings indicated mutual coupling of terminal Br groups.

Example 3

Synthesis of a Graft Copolymer

The polymer [1] (5 g) obtained in Production Example 1 and poly(sodium acrylate) (5 g, product of Wako Pure Chemical Industries) were mixed up and heated at 150° C. for 1 hour. The unreacted polymer [1] fraction was extracted with acetone to give a graft copolymer. The graft copolymer was insoluble in acetone but well dispersible in water.

Production Example 3

Synthesis of an Alkenyl-containing Carboxylic Acid Salt

Undecylenic acid (18.8 g, 0.102 mol) was added dropwise gradually to ½ N ethanolic solution of potassium hydroxide (200 mL) with stirring at 0° C. The volatile matter was distilled off under reduced pressure to give a crude product. The crude product was washed with acetone and heated under reduced pressure to give potassium undecylenate represented by the formula given below as a white solid (8.88 g, yield 88%). $CH_2=CH-(CH_2)_8-CO_2^-K^+$

Production Example 4

Synthesis of Br-terminated poly(butyl acrylate) (2)

A 100-mL glass reactor was charged with butyl acrylate (20.0 mL, 17.9 g, 0.140 mol), CuBr (0.625 g, 4.36 mmol), pentamethyldiethylenetriamine (0.91 mL, 0.755 g, 4.36 mmol) and acetonitrile (5 mL) and, after cooling, deaerated under reduced pressure and then nitrogen gas was introduced thereinto. After thorough stirring, methyl 2-bromopropionate (0.973 mL, 1.456 g, 8.72 mmol) was added. While heating at 70° C. with stirring, 30 mL of butyl acrylate was added dropwise slowly and the reaction was allowed to proceed. The mixture was treated with activated alumina and then the volatile matter was distilled off by heating under reduced pressure. The product was dissolved in ethyl acetate and washed with 2% hydrochloric acid and then with brine. The organic layer was dried over $Na_2SO_4$ and the volatile matter was distilled off by heating under reduced pressure to give a halogen-terminated polymer (polymer [2]). The polymer had a number average molecular weight of 5,270 and a molecular weight distribution of 1.08.

Example 4

Acceleration of the Substitution Reaction by Addition of an Amine (1)

The polymer [2] (1.5 g) obtained in Production Example 4, the potassium undecylenate (615 mg, 0.277 mmol) obtained in Production Example 3, triethylamine (12.7 mg, 0.126 mmol) and acetonitrile (0.84 mL) were charged, and the mixture was heated at 70° C. for 12 hours with stirring. Ethyl acetate was added to the mixture, the insoluble matter was filtered off, and the filtrate was washed with water. The organic layer was concentrated to give a polymer. The terminal bromine conversion was 49%.

Example 5

Acceleration of the Substitution Reaction by Addition of an Amine (2)

The procedure of Example 4 was followed in the same manner except that tetramethylethylenediamine (14.5 mg, 0.125 mmol) was used in lieu of triethylamine. The polymer obtained showed a terminal bromine conversion of 58%.

Comparative Example 1

Comparison with the Acceleration of the Substitution Reaction by Addition of an Amine For comparison, the reaction was carried out without using any nitrogen atom-containing compound. The procedure of Example 4 was followed without using the amine. The polymer obtained showed a terminal bromine conversion of 15%.

Production Example 5

Reaction of a Functional Group-containing Alcohol with a Cyclic Acid Anhydride

A 100-mL three-necked round-bottom flask was fitted with a reflux condenser and, in a nitrogen atmosphere, the flask was charged with phthalic anhydride (4.0 g, 13.5 mmol) and allyl alcohol (4.58 mL), and the contents were stirred at 90° C. for 30 minutes. The unreacted allyl alcohol fraction was distilled off under reduced pressure to give phthalic acid monoallyl ester (yield 5.66 g).

Potassium methoxide (1.70 g) was dissolved in methanol (20 mL) and the above carboxylic acid (5.00 g) was added, and the mixture was stirred thoroughly at room temperature. The volatile matter was distilled off under reduced pressure to give the potassium salt of the carboxylic acid.

Example 6

Polymer Terminal Br Conversion Using a Carboxylic Acid Salt Obtained by Reaction of a Functional Group-containing Alcohol with a Cyclic Acid Anhydride Using CuBr (0.625 g) as the catalyst, pentamethyldiethylenetriamine (0.83 mL) as the ligand and diethyl 2,5-dibromoadipate (1.57 g) as the initiator, butyl acrylate was polymerized at 70° C. to give poly(butyl acrylate) having bromine at both ends with a number average molecular weight of 10,900 and a molecular weight distribution of 1.12.

Then, the above polymer (8.1 g), the carboxylic acid potassium salt (0.333 g) obtained in Production Example 5, and dimethylacetamide (16.2 mL) were charged, and the reaction was allowed to proceed at 70° C. in a nitrogen atmosphere for 0.5 hour. Ethyl acetate was added to the mixture and the whole mixture was washed with water. The organic layer was concentrated to give a polymer. The number of alkenyl groups introduced per polymer molecule was found to be 1.44 by $^1H$ NMR analysis.

INDUSTRIAL APPLICABILITY

By substituting a polymer terminus with a carboxylic acid salt according to the invention, it is possible to effect, in a simple and easy manner, the coupling of a polymer derived from a radical-polymerizable monomer which is difficult to attain by the prior art technology. According to the invention, it is also possible to produce functional group-terminated vinyl polymers in a simple and easy manner. Similarly, it is also possible to produce, in a simple and easy manner, graft copolymers having a vinyl polymer as a branch polymer from a halogen-terminated vinyl polymer and a polymer having a side-chain carboxylate group through conversion of the terminal halogen atom(s) to a carboxylate group(s). Further, those vinyl polymers having a high proportion of carboxyl group(s) at a main chain terminus thereof which have been difficult to produce in the prior art can be produced in a simple and easy manner. Curable compositions comprising such polymers give cured products having very satisfactory characteristics, such as good rubber elasticity.

Furthermore, by utilizing cyclic carboxylic acid anhydrides, it becomes possible to obtain, in a simple and easy manner, vinyl polymers having a high proportion of a functional group at a main chain terminus thereof. By carrying out the reaction according to the invention in the presence of a nitrogen atom-containing compound, it is possible to accelerate the conversion reaction. It is further possible to carry out the conversion reaction directly in the polymerization system for vinyl polymer production.

What is claimed is:

1. A method of producing a polymer
   which comprises substitution of carboxylic acid group for a terminal halogen group of a polymer obtained by atom transfer radical polymerization,
   said substitution of carboxylic acid group comprising using a carboxylic acid group-containing compound,
   and said carboxylic acid group-containing compound being a polymer.

2. The method of producing a polymer according to claim 1,
   wherein the carboxylic acid group is a carboxylic acid salt group.

3. The method of producing a polymer according to claim 2,
   wherein the carboxylic acid salt group is a carboxylic acid potassium salt group.

4. The method of producing a polymer according to claim 1,
   wherein the atom transfer radical polymerization is carried out using a transition metal complex as the polymerization catalyst, said transition metal complex being a transition metal complex whose central metal is an element of the group 7, 8, 9, 10 or 11 of the periodic table of the elements.

5. The method of producing a polymer according to claim 4,
wherein the transition metal complex is a complex of copper, nickel, ruthenium or iron.

6. The method of producing a polymer according to claim 5,
wherein the transition metal complex is a copper complex.

7. The method of producing a polymer according to claim 1,
wherein the polymer obtained by atom transfer radical polymerization is obtained by polymerization of a (meth)acrylic monomer.

8. The method of producing a polymer according to claim 7,
wherein the (meth)acrylic monomer is an acrylic ester monomer.

9. The method of producing a polymer according to claim 1,
wherein the terminal halogen group of the polymer obtained by atom transfer radical polymerization is a secondary halogen group.

10. The method of producing a polymer according to claim 1,
wherein the polymerization is carried out in the presence of a nitrogen atom-containing compound.

11. The method of producing a polymer according to claim 10,
wherein the nitrogen atom-containing compound is selected from the group consisting of aliphatic amines, alicyclic amines, aromatic amines and heterocyclic nitrogen bases.

12. The method of producing a polymer according to claim 10,
wherein the atom transfer radical polymerization is carried out using an amine compound or pyridine compound as a ligand to the catalyst and using said ligand also as the nitrogen atom-containing compound.

13. The method of producing a polymer according to claim 12,
wherein the atom transfer radical polymerization is for polymerizing a vinyl monomer
and the carboxylic acid group substitution reaction is effected by adding a carboxyl-containing compound directly to the polymerization system.

14. The method of producing a polymer according to claim 1,
wherein the carboxylic acid group-containing compound has a carboxylic acid group in a side chain thereof.

15. The method of producing a polymer according to claim 14,
wherein a polymer obtained by the substitution reaction is a graft polymer.

16. The method of producing a polymer according to claim 14,
wherein a polymer obtained by the substitution reaction is a gel.

17. A method of producing a polymer
which comprises substitution of carboxylic acid group for a terminal halogen group of a polymer obtained by atom transfer radical polymerization,
said substitution of carboxylic acid group comprising using a carboxylic acid group-containing compound, and said carboxylic acid group-containing compound having two or more carboxylic acid groups.

18. The method of producing a polymer according to claim 17,
wherein the carboxylic acid group is a carboxylic acid salt group.

19. The method of producing a polymer according to claim 18,
wherein the carboxylic acid salt group is a carboxylic acid potassium salt group.

20. The method of producing a polymer according to claim 17,
wherein the atom transfer radical polymerization is carried out using a transition metal complex as the polymerization catalyst,
said transition metal complex being a transition metal complex whose central metal is an element of the group 7, 8, 9, 10 or 11 of the periodic table of the elements.

21. The method of producing a polymer according to claim 20,
wherein the transition metal complex is a complex of copper, nickel, ruthenium or iron.

22. The method of producing a polymer according to claim 21,
wherein the transition metal complex is a copper complex.

23. The method of producing a polymer according to claim 17,
wherein the polymer obtained by atom transfer radical polymerization is obtained by polymerization of a (meth)acrylic monomer.

24. The method of producing a polymer according to claim 23,
wherein the (meth)acrylic monomer is an acrylic ester monomer.

25. The method of producing a polymer according to claim 18,
wherein the terminal halogen group of the polymer obtained by atom transfer radical polymerization is a secondary halogen group.

26. The method of producing a polymer according to claim 18,
wherein the polymerization is carried out in the presence of a nitrogen atom-containing compound.

27. The method of producing a polymer according to claim 26,
wherein the nitrogen atom-containing compound is selected from the group consisting of aliphatic amines, alicyclic amines, aromatic amines and heterocyclic nitrogen bases.

28. The method of producing a polymer according to claim 26,
wherein the atom transfer radical polymerization is carried out using an amine compound or pyridine compound as a ligand to the catalyst and using said ligand also as the nitrogen atom-containing compound.

29. The method of producing a polymer according to claim 28,
wherein the atom transfer radical polymerization is for polymerizing a vinyl monomer
and the carboxylic acid group substitution reaction is effected by adding a carboxyl-containing compound directly to the polymerization system.

30. The method of producing a polymer according to claim 17, wherein substitution reaction is effected with a compound having two or more carboxylic acid groups, whereby the carboxylic acid groups are introduced into termini of the resulting polymer.

31. The method of producing a polymer according to claim 17, wherein substitution reaction is effected with a compound having two or more carboxylic acid groups, whereby polymer molecules are coupled together.

32. A method of producing a polymer which comprises substitution of carboxylic acid group for a terminal halogen group of a polymer obtained by atom transfer radical polymerization, said substitution of carboxylic acid group comprising using a carboxylic acid group-containing compound, and said carboxylic acid group-containing compound being obtained by reacting a cyclic acid anhydride with a functional group-containing alcohol.

33. The method of producing a polymer according to claim 32, wherein the carboxylic acid group is a carboxylic acid salt group.

34. The method of producing a polymer according to claim 33, wherein the carboxylic acid salt group is a carboxylic acid potassium salt group.

35. The method of producing a polymer according to claim 32, wherein the atom transfer radical polymerization is carried out using a transition metal complex as the polymerization catalyst, said transition metal complex being a transition metal complex whose central metal is an element of the group 7, 8, 9, 10 or 11 of the periodic table of the elements.

36. The method of producing a polymer according to claim 35, wherein the transition metal complex is a complex of copper, nickel, ruthenium or iron.

37. The method of producing a polymer according to claim 36, wherein the transition metal complex is a copper complex.

38. The method of producing a polymer according to claim 32, wherein the polymer obtained by atom transfer radical polymerization is obtained by polymerization of a (meth)acrylic monomer.

39. The method of producing a polymer according to claim 38, wherein the (meth)acrylic monomer is an acrylic ester monomer.

40. The method of producing a polymer according to claim 32, wherein the terminal halogen group of the polymer obtained by atom transfer radical polymerization is a secondary halogen group.

41. The method of producing a polymer according to claim 32, wherein the polymerization is carried out in the presence of a nitrogen atom-containing compound.

42. The method of producing a polymer according to claim 41, wherein the nitrogen atom-containing compound is selected from the group consisting of aliphatic amines, alicyclic amines, aromatic amines and heterocyclic nitrogen bases.

43. The method of producing a polymer according to claim 41, wherein the atom transfer radical polymerization is carried out using an amine compound or pyridine compound as a ligand to the catalyst and using said ligand also as the nitrogen atom-containing compound.

44. The method of producing a polymer according to claim 43, wherein the atom transfer radical polymerization is for polymerizing a vinyl monomer and the carboxylic acid group substitution reaction is effected by adding a carboxyl-containing compound directly to the polymerization system.

45. The method of producing a polymer according to claim 32, wherein the functional group is selected from the group consisting of alkenyl, hydroxyl, amino and epoxy groups.

46. The method of producing a polymer according to claim 32, wherein the cyclic acid anhydride is selected from the group consisting of succinic anhydride, phthalic anhydride and glutaric anhydride.

47. The method of producing a polymer according to claim 46, wherein the cyclic acid anhydride is phthalic anhydride.

* * * * *

UNITED STATES PATENT AND TRADEMARK OFFICE
CERTIFICATE OF CORRECTION

PATENT NO. : 6,653,429 B1
DATED : November 25, 2003
INVENTOR(S) : Yoshiki Nakagawa et al.

It is certified that error appears in the above-identified patent and that said Letters Patent is hereby corrected as shown below:

<u>Title page,</u>
Item [30], should read:

-- Foreign Application Priority Data

| | | |
|---|---|---|
| Jun. 1, 1998 | (JP)......................... | 10-151574 |
| Jul. 23, 1998 | (JP)......................... | 10-207323 |
| Jul. 23, 1998 | (JP)......................... | 10-207325 |
| Jul. 23, 1998 | (JP)......................... | 10-207326 |
| Oct. 19, 1998 | (JP)......................... | 10-296619 -- |

Signed and Sealed this

Seventeenth Day of August, 2004

JON W. DUDAS
*Acting Director of the United States Patent and Trademark Office*